US009612679B2

(12) United States Patent
Fu (10) Patent No.: US 9,612,679 B2
(45) Date of Patent: Apr. 4, 2017

(54) COLOR FILTER SUBSTRATE AND DISPLAY APPARATUS

(71) Applicant: Shenzhen China Star Optoelectronics Technology Co., Ltd., Guangdong (CN)

(72) Inventor: Ruhai Fu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 84 days.

(21) Appl. No.: 14/404,460

(22) PCT Filed: Jul. 17, 2014

(86) PCT No.: PCT/CN2014/082406
§ 371 (c)(1),
(2) Date: Aug. 25, 2015

(87) PCT Pub. No.: WO2016/008135
PCT Pub. Date: Jan. 21, 2016

(65) Prior Publication Data
US 2016/0011710 A1    Jan. 14, 2016

(30) Foreign Application Priority Data
Jul. 14, 2014    (CN) .......................... 2014 1 0333619

(51) Int. Cl.
*G02F 1/1335*    (2006.01)
*G06F 3/041*    (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ..... G02F 1/13338; G06F 3/044; G06F 3/0412
See application file for complete search history.

(56) References Cited

U.S. PATENT DOCUMENTS

2009/0194344 A1* 8/2009 Harley ................... G06F 3/044
178/18.06
2012/0044171 A1* 2/2012 Lee ......................... G06F 3/044
345/173
(Continued)

FOREIGN PATENT DOCUMENTS

CN    102749766    10/2012
CN    102929031    2/2013
(Continued)

OTHER PUBLICATIONS

International Search Report and the Written Opinion Dated Apr. 16, 2015 From the State Intellectual Property Office of the People's Republic of China Re. Application No. PCT/CN2014/082406 and Its Translation of Search Report in English.

*Primary Examiner* — Mariceli Santiago (57) ABSTRACT

A color filter substrate and a display apparatus are provided. The color filter substrate comprises touch sensing units disposed on a black matrix layer, and each of the touch sensing units comprises driving electrodes and sensing electrodes, and the driving electrodes and the sensing electrodes are disposed on the same layer and insulated from each other, and the driving electrodes extend from the driving wire, and the sensing electrodes extend from the sensing wire. At least one wiring unit comprises at least two driving wires and a sensing wire, and each of the driving wires is connected to the driving wire. A multi-touch structure with the monolayer mutual capacitance is achieved for reducing costs, as well as improving yields.

15 Claims, 4 Drawing Sheets (51) Int. Cl.
*G06F 3/044* (2006.01)
*G02F 1/1333* (2006.01)

(52) U.S. Cl.
CPC ...... *G06F 3/0412* (2013.01); *G02F 1/133512* (2013.01); *G02F 1/133514* (2013.01)

(56) References Cited

U.S. PATENT DOCUMENTS

| | | | | |
|---|---|---|---|---|
| 2012/0062248 | A1* | 3/2012 | Lee | G06F 3/044 324/679 |
| 2012/0256642 | A1* | 10/2012 | Badaye | G06F 3/044 324/658 |
| 2013/0308067 | A1* | 11/2013 | Hashimoto | G02B 27/2214 349/15 |
| 2014/0078420 | A1 | 3/2014 | Liu et al. | |
| 2014/0118283 | A1 | 5/2014 | Wang et al. | |
| 2014/0146005 | A1 | 5/2014 | Hong et al. | |
| 2014/0168540 | A1 | 6/2014 | Wang et al. | |
| 2014/0210784 | A1* | 7/2014 | Gourevitch | H03K 17/962 345/174 |
| 2014/0346493 | A1 | 11/2014 | Lee | |
| 2014/0354301 | A1* | 12/2014 | Trend | G06F 3/044 324/658 |
| 2015/0042604 | A1* | 2/2015 | Lu | G06F 3/044 345/174 |
| 2016/0018922 | A1 | 1/2016 | Wang et al. | |

FOREIGN PATENT DOCUMENTS

| | | |
|---|---|---|
| CN | 202904163 | 4/2013 |
| CN | 103149748 | 6/2013 |
| CN | 103176674 | 6/2013 |
| CN | 103218095 | 7/2013 |
| CN | 103293780 | 9/2013 |
| CN | 203178627 | 9/2013 |
| CN | 103488341 | 1/2014 |
| CN | 103793120 | 5/2014 |
| EP | 2743806 | 6/2014 |

\* cited by examiner

Fig.1

PRIOR ART

COLOR FILTER SUBSTRATE AND DISPLAY APPARATUS

RELATED APPLICATIONS

This application is a National Phase of PCT Patent Application No. PCT/CN2014/082406 having International filing date of Jul. 17, 2014, which claims the benefit of priority of Chinese Patent Application No. 201410333619.4 filed on Jul. 14, 2014. The contents of the above applications are all incorporated by reference as if fully set forth herein in their entirety.

FIELD OF THE INVENTION

The present invention relates to a display technology, and more particularly to a color filter substrate and a display apparatus.

BACKGROUND OF THE INVENTION

Figure 1:
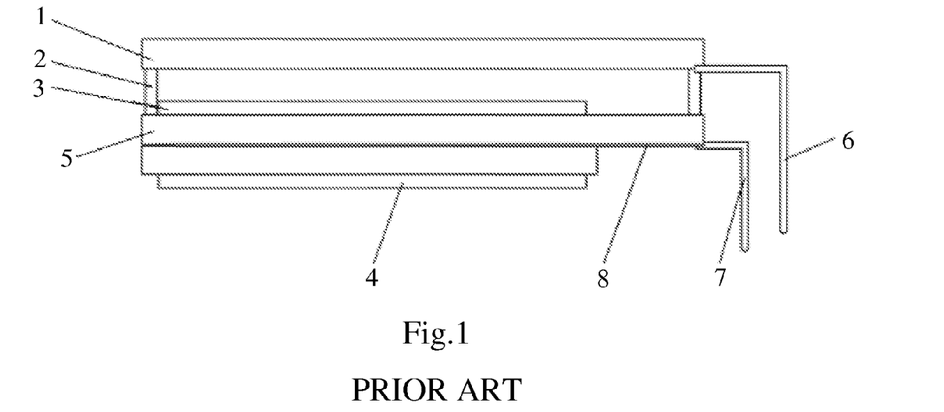
FIG. 1 is a schematic diagram showing a conventional liquid crystal display panel for touch sensing.

As shown in FIG. 1, in a conventional liquid crystal display (LCD), a capacitive touch-screen is disposed on a liquid crystal display panel for touch sensing. A liquid crystal cell 5 includes LCD display electrodes, two alignment layers, a liquid crystal layer, and glasses. An upper polarizer 3 is bonded to an upper surface of the liquid crystal cell 5, and a lower polarizer 4 is bonded to a lower surface of the liquid crystal cell 5, so as to form a normal liquid crystal display. A touch-screen 1 is bonded to an upper surface of the liquid crystal display by a twin adhesive 2. When a user touches the touch-screen, a touch signal is transmitted to a single-chip microcomputer through touch-screen wires 6, a filter circuit, and a touch-screen controller chip in sequence. Display instructions of the single-chip microcomputer are transmitted to an LCD driving chip, and the LCD driving chip outputs a corresponding voltage signal. According to the change of the voltage signal, the touch position can be determined.

In practice, there are some problems in the conventional technology, as described below.

Since the touch-screen is added thereon, the material (glass or PET) of the touch-screen will reduce the transmittance of the display. Due to the reduced transmittance, a display effect of the display is also affected. Furthermore, in the touch-screen technology, the structure is complex and has high costs and low reliability. For example, while the structural design is unreasonable, or the assembly thereof is poor, Newton's rings easily occur, and a life time thereof is limited. In addition, since the touch-screen has more circuit structures, it also easily fails in processing or use.

As a result, it is necessary to provide a new technology to solve the problems existing in the conventional technologies, as described above.

SUMMARY OF THE INVENTION

The present invention provides a color filter substrate and a display apparatus, and the touch screen and LCD panel are integrated into one piece for simplifying the process and structure, as well as promoting the transmittance and display effect of the display apparatus, and thus the monolayer mutual capacitance can be achieved in the in-cell touch screen for reducing the cost, as well as improving yields.

A primary object of the present invention is to provide a color filter substrate, comprising: a glass substrate; a black matrix layer disposed on the glass substrate; and a touch sensing assembly disposed on the black matrix layer, wherein the touch sensing assembly is a metal touch sensing layer, and the touch sensing assembly comprises: at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire, and in each of the touch sensing units, one of the sensing electrodes is disposed between two of the driving electrodes, and one of the driving electrodes is disposed between two of the sensing electrodes; at least one wiring unit comprising at least two driving wires and a sensing wire, and each of the driving wires is connected to the driving line in the touch sensing unit, and in the same row, the sensing wire is connected to the sensing lines of the touch sensing units.

In the above-mentioned color filter substrate, each of the touch sensing units comprises two sensing lines and a driving line, and the driving line is disposed between the two sensing lines.

In the above-mentioned color filter substrate, the driving wires and the sensing wire are wired from the color filter substrate.

In the above-mentioned color filter substrate, the driving wires and the sensing wire are wired from an array substrate, wherein the array substrate and the color filter substrate are assembled as an LCD cell.

In the above-mentioned color filter substrate, the color filter substrate further comprises: color resists, wherein each of the touch sensing units corresponds to at least one of the color resists.

Another object of the present invention is to provide a color filter substrate, comprising: a glass substrate; a black matrix layer disposed on the glass substrate; and a touch sensing assembly disposed on the black matrix layer, wherein the touch sensing assembly comprises: at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire; at least one wiring unit comprising at least two driving wires and a sensing wire, and each of the driving wires is connected to the driving line in the touch sensing unit, and in the same row, the sensing wire is connected to the sensing lines of the touch sensing units.

In the above-mentioned color filter substrate, in each of the touch sensing units, one of the sensing electrodes is disposed between two of the driving electrodes, and one of the driving electrodes is disposed between two of the sensing electrodes.

In the above-mentioned color filter substrate, each of the touch sensing units comprises two sensing lines and a driving line, and the driving line is disposed between the two sensing lines.

In the above-mentioned color filter substrate, the driving wires and the sensing wire are wired from the color filter substrate.

In the above-mentioned color filter substrate, the driving wires and the sensing wire are wired from an array substrate, wherein the array substrate and the color filter substrate are assembled as an LCD cell.

In the above-mentioned color filter substrate, the color filter substrate further comprises: color resists, wherein each of the touch sensing units corresponds to at least one of the color resists.

Still another object of the present invention is to provide a display apparatus comprising a color filter substrate, wherein the color filter substrate comprising: a glass substrate; a black matrix layer disposed on the glass substrate; and a touch sensing assembly disposed on the black matrix layer, wherein the touch sensing assembly comprises: at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire; at least one wiring unit comprising at least two driving wires and a sensing wire, and each of the driving wires is connected to the driving line in the touch sensing unit, and in the same row, the sensing wire is connected to the sensing lines of the touch sensing units.

In the above-mentioned display apparatus, in each of the touch sensing units, one of the sensing electrodes is disposed between two of the driving electrodes, and one of the driving electrodes is disposed between two of the sensing electrodes.

In the above-mentioned display apparatus, the driving wires and the sensing wire are wired from the color filter substrate.

In the above-mentioned display apparatus, the driving wires and the sensing wire are wired from an array substrate, wherein the array substrate and the color filter substrate are assembled as an LCD cell.

In comparison with the conventional technology, the touch screen and display panel are integrated into one piece for simplifying the process and structure, as well as promoting the transmittance and display effect of the display apparatus. Moreover, the touch sensing assembly formed by the metal layer is disposed on the black matrix layer of the color filter substrate without blocking the lighting area of the pixels, thereby ensuring the aperture ratio. Furthermore, in the touch sensing assembly, the driving electrodes and sensing electrodes are disposed on the same layer and insulated from each other, and thus the monolayer mutual capacitance can be achieved in the in-cell touch screen for reducing costs, as well as improving yields.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention.

Figure 2:
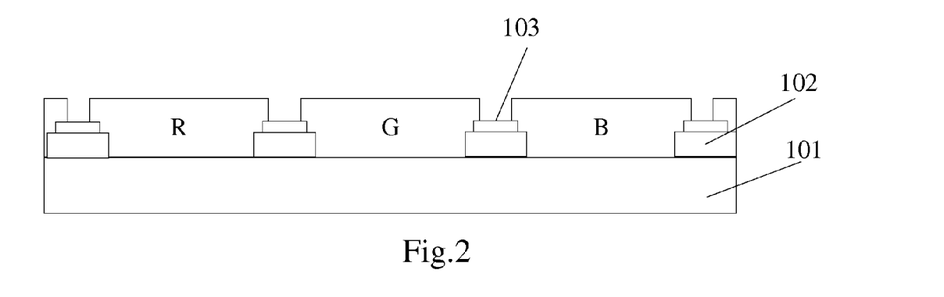
FIG. 2 is a schematic diagram showing a color filter substrate according to the present invention.

FIG. 2 is a schematic diagram showing a color filter substrate according to the present invention. The color filter substrate comprises a glass substrate 101, a black matrix layer 102 disposed on the glass substrate 101, and a touch sensing assembly 103 disposed on the black matrix layer 102.

Figure 3:
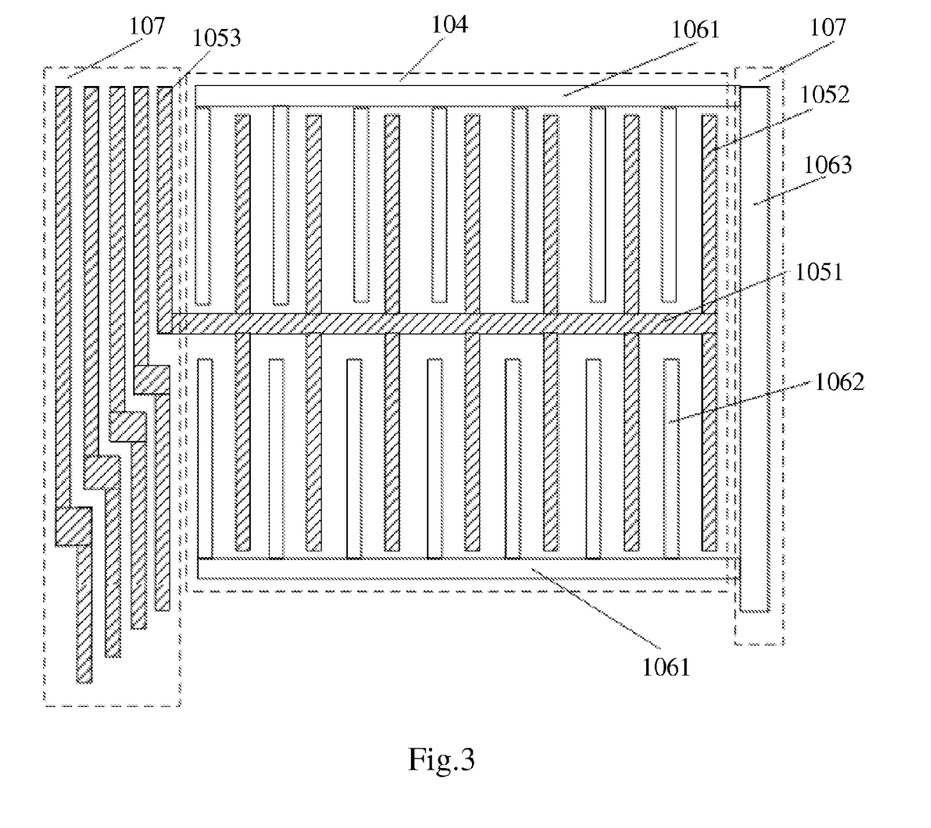
FIG. 3 is a schematic diagram showing the touch sensing assembly of a color filter substrate according to the present invention.

FIG. 3 is a schematic diagram showing the touch sensing assembly 103. The touch sensing assembly 103 comprises at least two touch sensing units 104 and at least one wiring unit 107. The at least two touch sensing units 104 are arranged in a matrix manner, and each of the touch sensing units 104 comprises a driving line 1051, sensing lines 1061, driving electrodes 1052, and sensing electrodes 1062, and the driving electrodes 1052 and sensing electrodes 1062 are disposed between the driving line 1051 and the sensing lines 1061.

Herein, the driving electrodes 1052 and sensing electrodes 1062 are disposed on the same layer and insulated from each other, and the driving electrodes 1052 extend from the driving line 1051, and the sensing electrodes 1062 extend from the sensing wire 1061.

The wiring unit 107 comprises at least two driving wires 1053 and a sensing wire 1063. Each of the driving wires 1053 is connected to the driving line 1051 in the touch sensing unit 104. In the same row, the sensing wire 1063 is connected to the sensing lines 1061 of the touch sensing units 104.

It is generally understood that, in the color filter substrate of the present invention, the touch sensing assembly 103 is a metal touch sensing layer disposed on the black matrix layer 102. As shown in FIG. 2, a width of the touch sensing assembly 103 is less than a width of the black matrix layer 102.

Moreover, the touch sensing assembly 103 comprises the at least two touch sensing units 104. As shown in FIG. 3, a schematic diagram showing the touch sensing units 104 is illustrated. The touch sensing unit 104 comprises a plurality of driving electrodes 1052 and a plurality of sensing electrodes 1062, wherein the driving electrodes 1052 and sensing electrodes 1062 are strip-like electrodes and disposed on the same layer. That is, the driving electrodes 1052 and sensing electrodes 1062 are positioned in the same metal layer, and the driving electrodes 1052 and sensing electrodes 1062 are insulated from each other for achieving the monolayer mutual capacitance.

It should be explained that the touch sensing electrodes of the touch screen are disposed in the LCD panel to form an in-cell touch screen, thereby reducing the thickness of the entire module and the production cost of the touch screen.

Furthermore, the monolayer mutual capacitance can be achieved in the in-cell touch screen for reducing costs, as well as improving yields.

Furthermore, the touch sensing assembly 103 comprises the wiring unit 107. As shown in FIG. 3, the wiring unit 107 comprises the at least two driving wires 1053 and the sensing wire 1063. Each of the driving wires 1053 is connected to the driving line 1051 in the touch sensing unit 104. That is, each of the touch sensing units 104 corresponds one of the driving wires 1053. In the same row, the sensing wire 1063 is connected to the sensing lines 1061 of the touch sensing units 104. That is, in the same row, the touch sensing units 104 correspond to the same sensing wire 1063.

Preferably, as shown in FIG. 3, each of the touch sensing units 104 comprises two sensing lines 1061 and a driving line 1051, and the driving line 1051 is disposed between the two sensing lines 1061, and the driving electrodes 1052 and sensing electrodes 1062 are disposed between the driving line 1051 and the sensing lines 1061.

It is generally understood that the driving electrodes 1052 and sensing electrodes 1062 are arranged as a finger-like arrangement, as shown in FIG. 3. More specifically, in each of the touch sensing units 104, one of the sensing electrodes 1062 is disposed between two of the driving electrodes 1052, and one of the driving electrodes 1052 is disposed between two of the sensing electrodes 1062.

Figure 4:
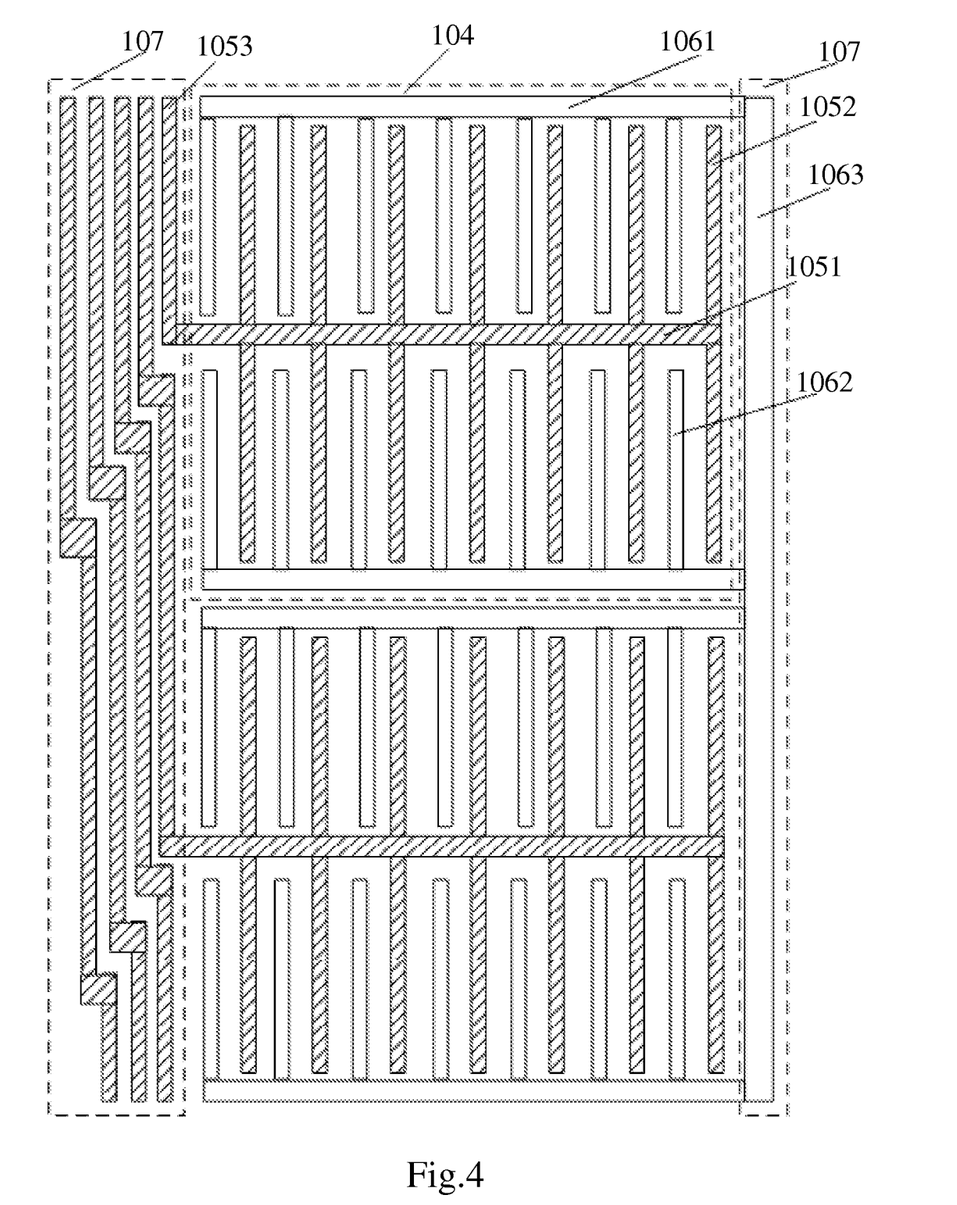
FIG. 4 is another schematic diagram showing the touch sensing assembly of a color filter substrate according to the present invention.

For easier understanding, further referring to FIG. 4, FIG. 4 is another schematic diagram showing the touch sensing assembly 103. In comparison with the touch sensing assembly 103 in FIG. 3, two of the touch sensing units 104 of the touch sensing assembly 103 are arranged in the same row in FIG. 4. The specific structure of the touch sensing units 104 is similar to the touch sensing assembly 103 in FIG. 3, and the similarities are not mentioned for simplification.

Figure 5:
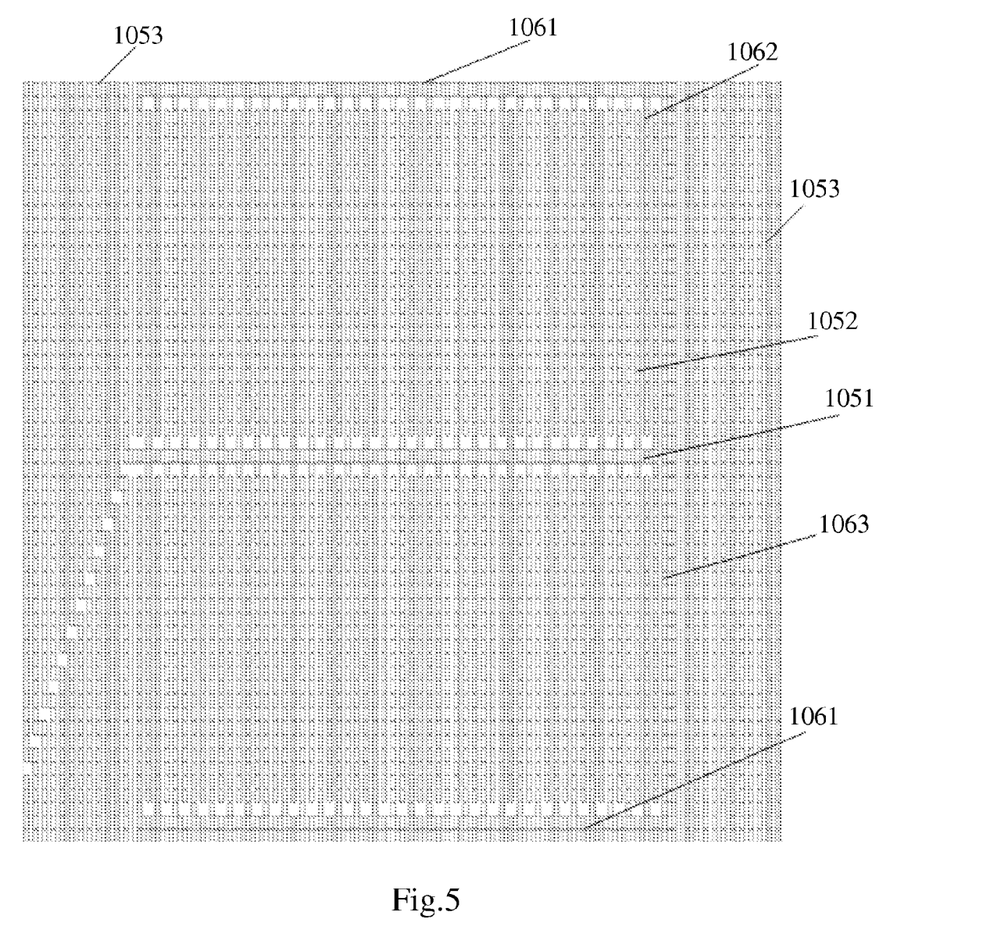
FIG. 5 is another schematic diagram showing the touch sensing assembly of a color filter substrate according to the present invention.

It is generally understood that the electrodes of the touch sensing assembly 103 are shown in FIGS. 3 and 4 by way of example, but are not limited thereto. Further referring to FIG. 5, in practice, FIG. 5 is a schematic diagram showing a multi-touch structure with the monolayer mutual capacitance on the black matrix layer 102, wherein only one of the touch sensing units 104 is explained for example.

In some embodiments, the driving wires 1053 and sensing wire 1063 can be wired from the color filter substrate by welding, and the driving wires 105 in the wiring unit 107 are arranged on the color filter substrate. In some embodiments, the driving wires 1053 and sensing wire 1063 can be wired from an array substrate, wherein the array substrate and the color filter substrate can be assembled as an LCD cell. It is generally understood that the driving wires 1053 and sensing wire 1063 can be wired to the array substrate through a conductive adhesive, and then the driving wires 1053 and sensing wire 1063 can be wired from the array substrate by welding.

In the embodiment of the present invention, as shown in FIGS. 3 and 4, when a touch object (a finger or a touch pen, etc.) touches the surface of the touch screen, a capacitance between the driving electrodes 1052 and sensing electrodes 1062 of the touch sensing unit 104 is affected, thereby changing an intensity of the electrical signal between the driving electrodes 1052 and sensing electrodes 1062, wherein a driving signal on the driving electrodes 1052 is provided by the driver chip. The change of the intensity of the electrical signal can be detected by the sensing electrodes 1062 for determining whether the touch sensing unit 104 is touched.

In this embodiment, the color filter substrate further comprises color resists (not shown), and each of the touch sensing units corresponds to at least one of the color resists. That is, in a touch area, the touch sensing units correspond to the plurality of color resists.

It is generally understood that, in the color filter substrate of the present invention, the driving electrodes 1052 and sensing electrodes 1062 are formed by a mask to pattern a metal layer on the black matrix layer 102, and the RGB color resists are formed after the metal layer, wherein the process of the RGB color resists will not be affected by the metal layer.

Therefore, in the color filter substrate of the present invention, the touch screen and LCD panel are integrated into one piece for simplifying the process and structure, as well as promoting the transmittance and display effect of the display apparatus. Moreover, the touch sensing assembly 103 formed by the metal layer is disposed on the black matrix layer 102 of the color filter substrate without blocking the lighting area of the pixels, thereby ensuring the aperture ratio. Furthermore, in the touch sensing assembly 103, the driving electrodes 1052 and sensing electrodes 1062 are disposed on the same layer and insulated from each other, and thus the multi-touch structure with the monolayer mutual capacitance can be achieved in the in-cell touch screen for reducing costs, as well as improving yields.

In the embodiment of the present invention, a display apparatus comprising the color filter substrate is provided. Herein, like reference numerals designate like elements throughout the specification, and the specific elements can be in reference with the color filter substrate in the description provided above.

Figure 6:
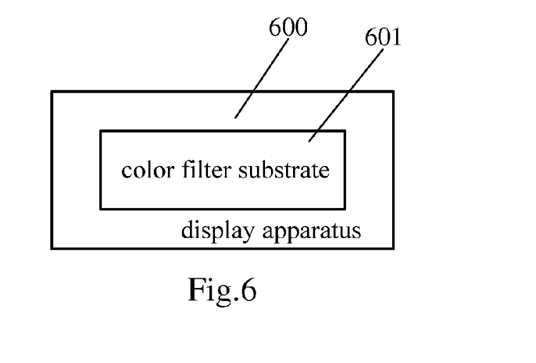
FIG. 6 is a schematic diagram showing a display apparatus according to the present invention.

FIG. 6 is a schematic diagram showing a display apparatus 600 according to the present invention. The display apparatus 600 comprises a color filter substrate 601, wherein the color filter substrate 601 can be in reference with the color filter substrate in the description provided above, as shown in FIG. 2. The color filter substrate 601 comprises a glass substrate 101, a black matrix layer 102 disposed on the glass substrate 101, and a touch sensing assembly 103 disposed on the black matrix layer 102.

Further referring to FIG. 3, FIG. 3 is a schematic diagram showing the touch sensing assembly 103. The touch sensing assembly 103 comprises at least two touch sensing units 104 and at least one wiring unit 107. The at least two touch sensing units 104 are arranged in a matrix manner, and each of the touch sensing units 104 comprises a driving line 1051, sensing lines 1061, driving electrodes 1052, and sensing electrodes 1062, and the driving electrodes 1052 and sensing electrodes 1062 are disposed between the driving line 1051 and the sensing lines 1061.

In this case, the driving electrodes 1052 and sensing electrodes 1062 are disposed on the same layer and insulated from each other, and the driving electrodes 1052 extend from the driving line 1051, and the sensing electrodes 1062 extend from the sensing wire 1061.

The wiring unit 107 comprises at least two driving wires 1053 and a sensing wire 1063. Each of the driving wires 1053 is connected to the driving line 1051 in the touch sensing unit 104. In the same row, the sensing wire 1063 is connected to the sensing lines 1061 of the touch sensing units 104.

It is generally understood that, in the color filter substrate of the present invention, the touch sensing assembly 103 is a metal touch sensing layer disposed on the black matrix layer 102. As shown in FIG. 2, a width of the touch sensing assembly 103 is less than a width of the black matrix layer 102.

Moreover, the touch sensing assembly 103 comprises the at least two touch sensing units 104. In FIG. 3, a schematic diagram showing the touch sensing units 104 is illustrated. The touch sensing unit 104 comprises a plurality of driving electrodes 1052 and a plurality of sensing electrodes 1062, wherein the driving electrodes 1052 and sensing electrodes 1062 are strip-like electrodes and disposed on the same layer. That is, the driving electrodes 1052 and sensing electrodes 1062 are positioned in the same metal layer, and the driving electrodes 1052 and sensing electrodes 1062 are insulated from each other for achieving monolayer mutual capacitance.

It should be explained that the touch sensing electrodes of the touch screen are disposed in the LCD panel to form an in-cell touch screen, thereby reducing the thickness of the entire module and the production cost of the touch screen. Furthermore, the monolayer mutual capacitance can be achieved in the in-cell touch screen for reducing the cost, as well as improving yields.

Furthermore, each of the driving wires 1053 is connected to the driving line 1051 in the touch sensing unit 104. That is, each of the touch sensing units 104 corresponds one of the driving wires 1053. In the same row, the sensing wire 1063 is connected to the sensing lines 1061 of the touch sensing units 104. That is, in the same row, the touch sensing units 104 correspond to the same sensing wire 1063.

Preferably, as shown in FIG. 3, each of the touch sensing units 104 comprises two sensing lines 1061 and a driving line 1051, and the driving line 1051 is disposed between the two sensing lines 1061, and the driving electrodes 1052 and sensing electrodes 1062 are disposed between the driving line 1051 and the sensing lines 1061.

The driving electrodes 1052 and sensing electrodes 1062 are arranged in a finger-like arrangement, as shown in FIG. 3. More specifically, in each of the touch sensing units 104, one of the sensing electrodes 1062 is disposed between two of the driving electrodes 1052, and one of the driving electrodes 1052 is disposed between two of the sensing electrodes 1062.

It is generally understood that the electrodes of the touch sensing assembly 103 are shown in FIGS. 3 and 4 by way of example, but are not limited thereto. Further referring to FIG. 5, in practice, FIG. 5 is a schematic diagram showing a multi-touch structure with the monolayer mutual capacitance on the black matrix layer 102, wherein only one of the touch sensing units 104 is explained for example.

In some embodiments, the driving wires 1053 and sensing wire 1063 can be wired from the color filter substrate by welding, and the driving wires 1053 in the wiring unit 107 are arranged on the color filter substrate. In some embodiments, the driving wires 1053 and sensing wire 1063 can be wired from an array substrate, wherein the array substrate and the color filter substrate can be assembled as an LCD cell. It is generally understood that the driving wires 1053 and sensing wire 1063 can be wired to the array substrate through a conductive adhesive, and then the driving wires 1053 and sensing wire 1063 can be wired from the array substrate by welding.

In addition, the color filter substrate further comprises color resists (not shown), and each of the touch sensing units corresponds to at least one of the color resists. That is, in a touch area, the touch sensing units correspond to the plurality of color resists.

It should be explained that the display apparatus of the present invention comprises a touch sensing structure (the above-mentioned touch sensing assembly 103). It is generally understood that the touch sensing structure can be applied to any flat panel display (FPD). In the FPD, the touch sensing structure formed by a single metal layer being disposed outside the display areas of the pixels. That is, metal lines of the driving electrodes and sensing electrodes of the touch sensing assembly are positioned in the opaque areas of the FPD without blocking the lighting area of the pixels. The LCD display apparatus has been described in the embodiments of the present invention, i.e. the touch sensing structure is formed on the black matrix layer of the color filter substrate by monolayer metal lines, but is not limited thereto. The touch sensing structure can be applied to any flat panel display.

Therefore, in the display apparatus of the present invention, the touch screen and display panel are integrated into one piece for simplifying the process and structure, as well as promoting the transmittance and display effect of the display apparatus. Moreover, the touch sensing assembly 103 formed by the metal layer is disposed on the black matrix layer 102 of the color filter substrate without blocking the lighting area of the pixels, thereby ensuring the aperture ratio. Furthermore, in the touch sensing assembly 103, the driving electrodes 1052 and sensing electrodes 1062 are disposed on the same layer and insulated from each other, and thus the monolayer mutual capacitance can be achieved in the in-cell touch screen for reducing costs, as well as improving yields.

In the above embodiments, the description of the various embodiments has focused on a certain embodiment is not described in detail section, you can see the relevant description in other embodiments, which are not mentioned here.

Those skilled in the art will recognize that, with reference to the words used herein, "preferably" means serving as an example, a sample, or an illustration. Text described as "preferred" any aspect or design necessarily to be construed as advantageous over other aspects or designs. In contrast, the term "preferred", is meant in the particular the way of the concept. As used herein, the term "or" is intended to mean containing "or" not exclude "or." That is, unless specified otherwise, or clear from the context, "X employs 101 or 102" means an arrangement of any nature, including. That is, if X employs 101; X employs 102; or X employs both 101 and 102, then "X employs 101 or 102" is met in any of the foregoing examples.

Although the invention has been shown and described with respect to certain illustrated aspects, it should be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such features may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

The present invention has been described with preferred embodiments thereof and it is understood that many changes and modifications to the described embodiment can be carried out without departing from the scope and the spirit of the invention that is intended to be limited only by the appended claims.

What is claimed is:

1. A color filter substrate, comprising:
   a glass substrate;
   a black matrix layer disposed on the glass substrate; and
   a touch sensing assembly disposed on the black matrix layer, wherein the touch sensing assembly is a metal touch sensing layer, and the touch sensing assembly comprises:
      at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire, and in each of the touch sensing units, one of the sensing electrodes is disposed between two of the driving electrodes, and one of the driving electrodes is disposed between two of the sensing electrodes;
      at least one wiring unit comprising at least two driving wires and a sensing wire, and each of the driving wires is connected to the driving wire in the touch sensing unit, and in the same row, the sensing wire is connected to the sensing lines of the touch sensing units.

2. The color filter substrate according to claim 1, wherein each of the touch sensing units comprises two sensing lines and a driving line, and the driving line is disposed between the two sensing lines.

3. The color filter substrate according to claim 1, wherein the driving wires and the sensing wire are wired from the color filter substrate.

4. The color filter substrate according to claim 1, wherein the driving wires and the sensing wire are wired from an array substrate, wherein the array substrate and the color filter substrate are assembled as an LCD cell.

5. The color filter substrate according to claim 1, further comprising: color resists, wherein each of the touch sensing units corresponds to at least one of the color resists.

6. A color filter substrate, comprising:
   a glass substrate;
   a black matrix layer disposed on the glass substrate; and
   a touch sensing assembly disposed on the black matrix layer, wherein the touch sensing assembly comprises:
      at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire;
      at least one wiring unit comprising at least two driving wires and a sensing wire, and each of the driving wires is connected to the driving line in the touch sensing unit, and in the same row, the sensing wire is connected to the sensing lines of the touch sensing units.

7. The color filter substrate according to claim 6, wherein, in each of the touch sensing units, one of the sensing electrodes is disposed between two of the driving electrodes, and one of the driving electrodes is disposed between two of the sensing electrodes.

8. The color filter substrate according to claim 6, wherein each of the touch sensing units comprises two sensing lines and a driving line, and the driving line is disposed between the two sensing lines.

9. The color filter substrate according to claim 6, wherein the driving wires and the sensing wire are wired from the color filter substrate.

10. The color filter substrate according to claim 6, wherein the driving wires and the sensing wire are wired from an array substrate, wherein the array substrate and the color filter substrate are assembled as an LCD cell.

11. The color filter substrate according to claim 6, further comprising: color resists, wherein each of the touch sensing units corresponds to at least one of the color resists.

12. A display apparatus comprising a color filter substrate, wherein the color filter substrate comprises:
    a glass substrate;
    a black matrix layer disposed on the glass substrate; and
    a touch sensing assembly disposed on the black matrix layer, wherein the touch sensing assembly comprises:
       at least two touch sensing units arranged in a matrix manner, wherein each of the touch sensing units comprises a driving line, sensing lines, driving electrodes, and sensing electrodes, and the driving electrodes and sensing electrodes are disposed between the driving line and the sensing lines, and the driving electrodes and the sensing electrodes are disposed on the same layer and insulated from each other, and the driving electrodes extend from the driving line, and the sensing electrodes extend from the sensing wire;
       at least one wiring unit comprising at least two driving wires and a sensing wire, and each of the driving wires is connected to the driving line in the touch sensing unit, and in the same row, the sensing wire is connected to the sensing lines of the touch sensing units.

13. The display apparatus according to claim 12, wherein, in each of the touch sensing units, one of the sensing electrodes is disposed between two of the driving electrodes, and one of the driving electrodes is disposed between two of the sensing electrodes.

14. The display apparatus according to claim 12, wherein the driving wires and the sensing wire are wired from the color filter substrate.

15. The display apparatus according to claim 12, wherein the driving wires and the sensing wire are wired from an array substrate, wherein the array substrate and the color filter substrate are assembled as an LCD cell.

* * * * *